No. 754,694. PATENTED MAR. 15, 1904.
A. E. POST.
ELECTRIC POCKET LAMP.
APPLICATION FILED DEC. 30, 1903.
NO MODEL.
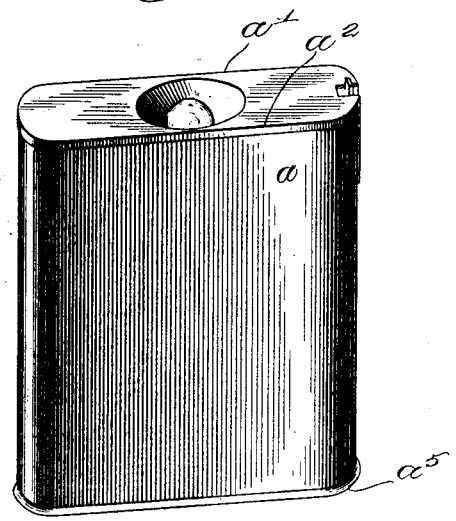
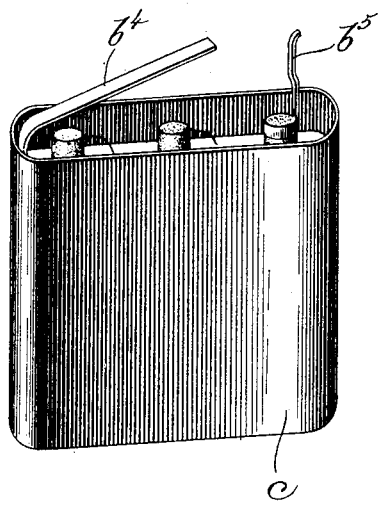
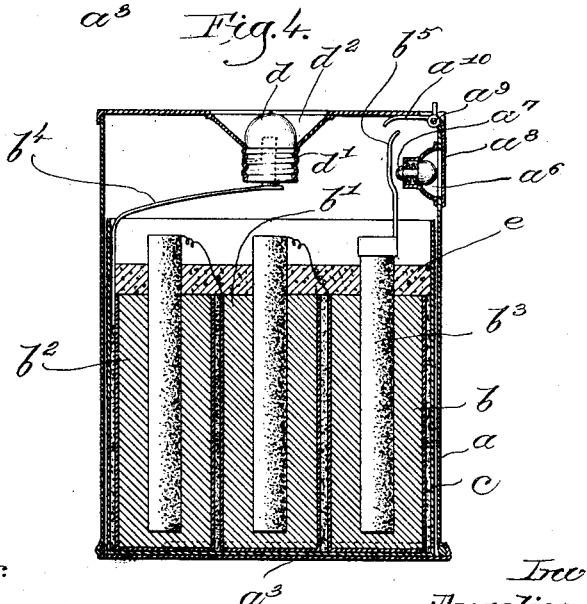
Witnesses:
Inventor.
Angelica E. Post, No. 754,694.

Patented March 15, 1904.

UNITED STATES PATENT OFFICE.

ANGELICA E. POST, OF BOSTON, MASSACHUSETTS.

ELECTRIC POCKET-LAMP.

SPECIFICATION forming part of Letters Patent No. 754,694, dated March 15, 1904.

Application filed December 30, 1903. Serial No. 187,112. (No model.)

*To all whom it may concern:*

Be it known that I, ANGELICA E. POST, a citizen of the United States, residing in Boston, in the county of Suffolk, in the State of Massachusetts, have invented an Improvement in Electric Pocket-Lamps, of which the following description, in connection with the accompanying drawings, is a specification, like letters on the drawings representing like parts.

My invention is an electric pocket-lamp, and has for its object the provision of a comparatively long-lived dry-battery apparatus to be accommodated to the requirements of use in connection with the vest-pocket. For this purpose the lamp must be thin and relatively flat and yet capable of carrying several cells and rendered incapable of accidentally closing the circuit while in the pocket, besides various other requirements which will appear more fully in the course of the following description, reference being had to the accompanying drawings, in which I have shown one form of my invention.

In the drawings, Figures 1, 2, and 3 are perspective views of the various portions of the apparatus separated, and Fig. 4 is a view in vertical longitudinal section of the battery assembled.

I do not restrict my invention to any particular ingredients or kind of battery, as my invention resides in so constructing and combining the parts as to afford a practical lamp for the vest-pocket capable of long life without rapid deterioration. For this purpose the case $a$ has a width and height to correspond to the width and depth of a usual vest-pocket, being also thin and having flat parallel sides, as indicated at $a'$ $a^2$, the top and bottom thereof being flat and said sides merging into curved edges, as clearly shown in Fig. 1.

Pocket-lamps have heretofore been made in which the case was round and long, containing cells placed end to end; but my construction enables me to place the cells side by side, as indicated at $b$ $b'$ $b^2$, where three cells are shown, the holder $c$ therefor having a shape corresponding to the case, excepting that it is shorter, so as to permit the circuit-closing mechanism and lamp-contacts to be placed at the end of the cells and to have sufficient movement. The holder $c$ having been inserted in the case is retained therein by the bottom $a^3$, having an inwardly-curved flange $a^4$ in sliding engagement with a rib $a^5$ at the bottom of the case. Each cell is composed of zinc and contains proper chemicals, in the center of which is a carbon $b^3$, the cells being electrically connected in the usual manner. Projecting from the zinc portion of the cell $b^2$ is a spring-contact $b^4$, and projecting from the carbon $b^3$ of the cell $b$ is another spring-contact $b^5$. An incandescent bulb $d$ is screwed at $d'$ into the bottom of a cavity $d^2$, which also constitutes a reflector, one terminal thereof being connected in usual manner to the case and the other terminal bearing on the contact $b^4$.

At one side of the case, herein shown as the right-hand side, Fig. 4, is a cavity $a^6$, containing a push-button or contact-maker $a^7$, adapted to engage the spring $b^5$, and inclosing this cavity $a^6$ is a door or guard $a^8$, hinged at $a^9$ and provided with means for causing the cooperating contacts $b^5$ $a^7$ to come into contact, said means being shown as comprising an arm $a^{10}$, projecting rearwardly therefrom, so that when the door $a^8$ is raised by the operator the arm $a^{10}$ will engage the spring $b^5$ and compel the contacts to come together.

In order to permit the free escape of gases from the cells and also accommodate the expansion thereof due to the heat of the body and the decided changes of temperature which take place by changing the lamp back and forth from the pocket, I inclose the cells with a permeable composition $e$, composed of paraffin and asphalt made by mixing two parts paraffin with one part of ceresin and also mixing two parts asphalt to one part colophony and then mixing these two mixtures together.

The operation of my invention will be obvious without further description.

The shape and arrangement are such that the lamp fits neatly and snugly in the ordinary vest-pocket, and yet there is no danger of the tightness of the pocket serving accidentally to close the circuit, because the guard or door $a^8$ effectually prevents the same and makes it impossible for the lamp to be operated while in the pocket, inasmuch as said door must be swung outwardly in order to close the circuit, and the permeable covering $e$ tends also to promote the life of the battery.

If desired, the arm $a^{10}$ may be a conductor, in which case it will close the circuit, or in some instances it may be omitted and the door $a^8$ be depended upon merely to guard the push-button $a^7$, which will then serve to operate the lamp alone.

I am aware that various other changes may be resorted to without departing from the spirit and scope of my invention.

Having described my invention, what I claim as new, and desire to secure by Letters Patent, is—

1. An electric lamp for the vest-pocket, comprising an oblong flat case, a removable holder fitting snugly within the case at one end, means for retaining the same in said case, said holder having a plurality of cells arranged side by side therein, a lamp carried by said casing at its other end and swinging means for operating said lamp.

2. An electric lamp for the vest-pocket, comprising a case having flat top and bottom ends, rounded edges and flat sides, a battery consisting of a plurality of cells arranged side by side and extending longitudinally of the case, a holder containing said cells and having substantially the same shape as the case, but having its upper end spaced from the top of the case, a lamp at the top of the case above the cells, and means for retaining said holder and battery within the case.

3. An electric lamp for the vest-pocket, comprising a case having flat top and bottom ends, rounded edges and flat sides, the bottom end being removable, a holder inclosed within the case and adapted to be inserted through the bottom thereof, said holder being shorter than the case to provide the space at the top thereof, a plurality of cells contained within the holder and extending longitudinally of the case, a lamp at the top of the case above the cells and a circuit-closing device on one edge of the case adjacent the top thereof.

4. An electric lamp for the vest-pocket, comprising a case having a flat top and bottom, rounded ends, and flat sides $a'$, $a^2$, a battery consisting of a plurality of cells arranged side by side, a holder containing them and having substantially the same shape as the case, means for retaining said holder and battery within the case, and a circuit-closing device at one end of said case and adjacent the top thereof, and a movable guard for preventing accidental closing of said circuit, said guard being hinged at its upper end to hang over said circuit-closing device.

5. An electric lamp for the vest-pocket, comprising a case having flat top and bottom ends, rounded edges and flat sides, a battery consisting of a plurality of cells arranged side by side and extending longitudinally of the case, a holder containing said cells and situated within the case, a circuit-closing device at one edge of the case adjacent the top thereof, a swinging guard to prevent accidental operation of the circuit-closing device, said guard having an arm arranged to engage one of the contacts of the circuit-closer when the guard is turned about its pivot.

In testimony whereof I have signed my name to this specification in the presence of two subscribing witnesses.

ANGELICA E. POST.

Witnesses:
   GEO. H. MAXWELL,
   EDWARD F. ALLEN.